United States Patent
Karsikas et al.

(10) Patent No.: US 10,406,828 B2
(45) Date of Patent: Sep. 10, 2019

(54) COLOUR MARKING METAL SURFACES

(71) Applicant: CAJO TECHNOLOGIES OY, Kempele (FI)

(72) Inventors: Tomi Karsikas, Raahe (FI); Niko Karsikas, Raahe (FI)

(73) Assignee: CAJO TECHNOLOGIES OY, Kempele (FI)

( * ) Notice: Subject to any disclaimer, the term of this patent is extended or adjusted under 35 U.S.C. 154(b) by 0 days.

(21) Appl. No.: 15/658,162

(22) Filed: Jul. 24, 2017

(65) Prior Publication Data
US 2017/0320337 A1 Nov. 9, 2017

Related U.S. Application Data

(63) Continuation of application No. 14/784,851, filed as application No. PCT/FI2014/050277 on Apr. 16, 2014, now Pat. No. 9,738,093.

(30) Foreign Application Priority Data

Apr. 18, 2013 (FI) .................................... 20135386

(51) Int. Cl.
  B41J 3/413 (2006.01)
  B41J 2/44 (2006.01)
  (Continued)

(52) U.S. Cl.
  CPC .......... *B41J 3/413* (2013.01); *B23K 26/0006* (2013.01); *B23K 26/125* (2013.01); (Continued)

(58) Field of Classification Search
  CPC ...... B23K 26/00; B23K 26/03; B23K 26/032; B23K 26/0342; B23K 26/064; B41M 5/24; B41M 5/245; B41M 5/34; B41M 5/345
  See application file for complete search history.

(56) References Cited

U.S. PATENT DOCUMENTS 4,692,191 A * 9/1987 Maeda ................... B44C 1/005
148/241
5,959,768 A 9/1999 Hutton
(Continued)

FOREIGN PATENT DOCUMENTS

EP 1758045 A1 2/2007
JP 2003-1442 A 1/2003
(Continued)

*Primary Examiner* — Kristal Feggins
*Assistant Examiner* — Kendrick X Liu
(74) *Attorney, Agent, or Firm* — Birch, Stewart, Kolasch & Birch, LLP (57) ABSTRACT

A controlling apparatus, comprising:
at least one processor; and
at least one memory including computer program code,
wherein the at least one memory and the computer program code are configured to, with the at least one processor, cause the apparatus at least to:
obtain a file comprising an image to be marked on a surface;
analyze the image to be marked on the surface and determine one or more continuous areas of the image having the same fill color and on colors in the image;
obtain information on the quality and thickness of the surface of the object to be marked;
determine order in which the areas of the image with different colors are to be marked;
determine on the basis of the determined and obtained information parameters for a laser marking apparatus separately for each area of the image with different colors; and
store determined parameters in a marking file.

15 Claims, 4 Drawing Sheets

(51) Int. Cl.
*B41J 2/47* (2006.01)
*B23K 26/00* (2014.01)
*B23K 26/12* (2014.01)
*B41J 2/455* (2006.01)

(52) U.S. Cl.
CPC .............. *B23K 26/127* (2013.01); *B41J 2/442* (2013.01); *B41J 2/455* (2013.01); *B41J 2/47* (2013.01)

(56) References Cited

U.S. PATENT DOCUMENTS

| | | | |
|---|---|---|---|
| 5,990,444 A | 11/1999 | Costin | |
| 6,231,196 B1* | 5/2001 | Mahachek | G02B 5/08 359/15 |
| 6,819,972 B1 | 11/2004 | Martin et al. | |
| 8,585,956 B1 | 11/2013 | Pagryzinski et al. | |
| 8,794,724 B2* | 8/2014 | Costin, Sr. | B41J 3/42 347/2 |
| 9,138,826 B2 | 9/2015 | Harrison | |
| 9,738,093 B2* | 8/2017 | Karsikas | B41J 3/413 |
| 2001/0030002 A1 | 10/2001 | Zheng et al. | |
| 2002/0179580 A1 | 12/2002 | Costin | |
| 2004/0137201 A1 | 7/2004 | Hannan et al. | |
| 2007/0117287 A1* | 5/2007 | Miyairi | B23K 26/032 438/151 |
| 2007/0245956 A1* | 10/2007 | Ruuttu | C23C 14/0611 118/620 |
| 2009/0266804 A1* | 10/2009 | Costin | B29C 47/0014 219/121.85 |
| 2011/0261141 A1* | 10/2011 | Costin, Sr. | B41M 5/24 347/262 |
| 2013/0299465 A1* | 11/2013 | Sukhman | B23K 26/00 219/121.61 |
| 2014/0083984 A1* | 3/2014 | Gerke | B23K 26/355 219/121.61 |
| 2016/0059582 A1* | 3/2016 | Karsikas | B41J 2/455 347/225 |
| 2016/0144457 A1* | 5/2016 | Karsikas | B41J 2/455 118/697 |

FOREIGN PATENT DOCUMENTS

| | | |
|---|---|---|
| JP | 2004-250786 A | 9/2004 |
| JP | 2008-280562 A | 11/2008 |
| JP | 2009-62623 A | 3/2009 |
| JP | 2012-79885 A | 4/2012 |

* cited by examiner

FIG. 6

COLOUR MARKING METAL SURFACES

CROSS-REFERENCE TO RELATED APPLICATIONS

This application is a Continuation of U.S. patent application Ser. No. 14/784,851 filed on Oct. 15, 2015, which is the National Phase of PCT International Application No. PCT/FI2014/050277 filed on Apr. 16, 2014, which claims the benefit of priority of Finnish Application No. 20135386 filed in Finland on Apr. 18, 2013, all of which are hereby expressly incorporated by reference into the present application.

FIELD

The exemplary and non-limiting embodiments of the invention relate generally to marking or colouring steel surfaces.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Metal or steel surfaces are in many applications marked or coloured with various marks or colours. The purpose may be esthetical or sometimes the purpose is to protect the surface. A common method for colouring metal surfaces is to use paints, adhesive labels, etching or electrolytic colouring. These methods are very limited and the processes are not flexible. This applies especially applications where different markings are required on the metal surfaces. The markings and colours are not durable. In addition, the methods may involve the use of paints and solvents which are harmful to environment.

Marking small steel surfaces with a laser beam has been known for a few years in laboratory environments. However, practical applications of the known techniques have not been proposed and the obtained markings are simple.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus for marking a metal surface, comprising: a bed for an object comprising a metal surface, a cover forming an airtight space over the bed, a laser marking unit capable of forming a laser beam onto the metal surface, a gas unit for controlling the atmosphere of the space under the cover, a coating unit for producing a coating on the metal surface, a temperature control unit for controlling the temperature of the space under the cover, at least one processor; and at least one memory including computer program code, the at least one memory and the computer program code configured to, with the at least one processor, cause the apparatus at least to perform: receive from a remote computer control data comprising parameters to create a pattern on the metal surface; control the temperature control unit and the gas unit to produce a temperature and atmosphere in space under the cover on the basis of the parameters; control the focus and bandwidth of the laser marking unit on the basis of the parameters to produce the pattern on the metal surface; and control the coating unit on the basis of the parameters to produce a coating on the metal surface.

According to another aspect of the present invention, there is provided a controlling apparatus, comprising: at least one processor; and at least one memory including computer program code, the at least one memory and the computer program code configured to, with the at least one processor, cause the apparatus at least to perform: obtain a file comprising an image; determine information on differently coloured areas of the image; determine information on colours in the image; obtain information on the properties of the surface of the object to be marked; determine information on order in which the areas of the image with different colours are to be marked; determine parameters for a laser marking apparatus on the basis of the determined and obtained information; store determined parameters in a marking file.

According to yet another aspect of the present invention, there is provided a computer program product embodied on a distribution medium readable by a computer and comprising program instructions which, when loaded into an apparatus, execute steps comprising: obtain a file comprising an image; determine information on areas of the image with different colours; determine information on colours in the image; obtain information on the properties of the surface of the object to be marked; determine information on order in which the areas of the image with different colours are to be marked; determine parameters for a laser marking apparatus on the basis of the determined and obtained information; and store determined information in a marking file.

Embodiments of the invention provide several advantages. The markings realized with the embodiments are very durable against wear and corrosion. Practically any multi-colour graphical image may be marked onto a metal or steel surface. In general, a metal surface may be matted on shining or have other variable properties. In an embodiment, the marking process leaves these properties and surface quality of the metal surface visible regardless of the marking. The objects to be marked are not limited to small size metal plates but may be applied to objects having challenging geometrical shapes.

LIST OF DRAWINGS

Embodiments of the present invention are described below, by way of example only, with reference to the accompanying drawings, in which.

DESCRIPTION OF SOME EMBODIMENTS

Figure 1:
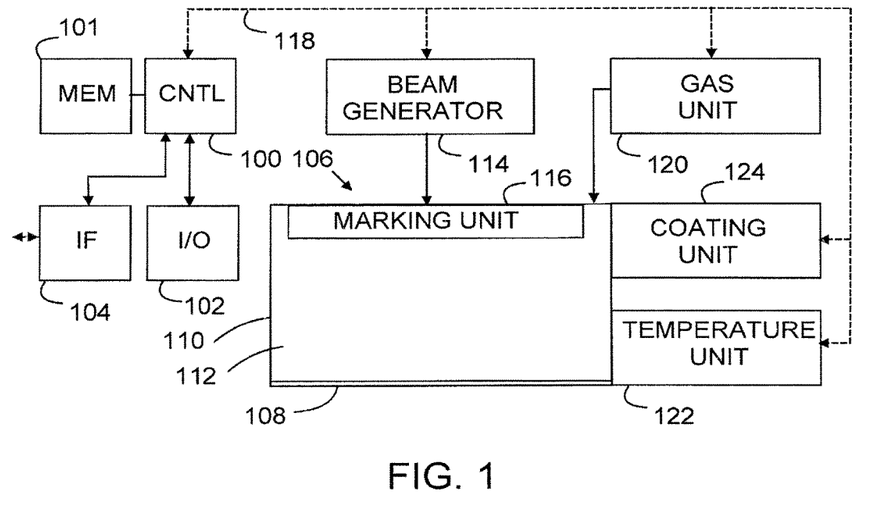
FIG. 1 illustrates an example of an apparatus for marking or colouring steel surfaces.

FIG. 1 illustrates a schematic example of an apparatus suitable for marking or colouring objects having metal or steel surfaces. It should be understood that the apparatus is depicted herein as an example illustrating some embodiments. It is apparent to a person skilled in the art that the apparatus may also comprise other functions and/or structures and not all described functions and structures are required. The figure is purely schematic and the actual location of the units of a realized apparatus may be different as one skilled in the art is aware. The apparatus comprises a controller unit or control circuitry 100. The controller unit or control circuitry is typically realized with at least one processor; and at least one memory 101 including computer program code, the at least one memory and the computer program code configured to control the operation of the apparatus. The controller unit or control circuitry 100 may comprise an input/output unit 102 either as a separate device as illustrated or integrated with the controller unit 100. The input/output unit 102 may comprise a keyboard, a display, and other input and output devices known in the art. The controller unit 100 may further comprise a communication interface 104 either as a separate device as illustrated or integrated with the controller unit 100. The communication interface 104 may communicate with other devices via Internet, for example. The communication interface 104 may be a wired or wireless network interface, a modem or any other suitable interface known on the art.

The apparatus further comprises an arrangement 106 for directing a laser beam to an object to be marked. The apparatus comprises a bed 108 on which an object comprising a metal surface to be marked may be placed. In an embodiment, a cover 110 is configured to form an airtight space 112 surrounding the bed 106.

The apparatus further comprises a laser beam generator 114 configured to generate a laser beam. The laser beam is directed to the object to be marked using a laser marking unit 116. The laser marking unit 116 may comprise one or more heads emitting laser beams.

The beam generator generates a laser beam which is transferred using a fibre or an optical path to a marking unit. The marking unit directs the laser beam to the object to be marked. The direction may be utilised using mirrors, optical fibres, lens systems or scanning optics, for example.

The controller unit 100 is configured to control 118 the operation of the beam generator 114 and the marking unit 116.

The apparatus further comprises a gas unit 120 for controlling the atmosphere of the space 112 under the cover and a temperature control unit 122 configured to control the temperature of the space under the cover by either heating or cooling. Both units are controlled by the controlling unit 100.

In an embodiment, the apparatus comprises a coating unit 124 for producing a coating on the metal surface on the bed under the control of the controlling unit 100.

The laser marking process requires determining the operation parameters for the different units of the above apparatus. The beam generator 114 requires parameters for generating a laser beam with suitable properties, The marking unit 116 requires parameters for controlling and directing the laser beam, the gas unit 120 requires information on required atmosphere, the temperature controlling unit 122 requires parameters for controlling the temperatures at different phases of the marking process and finally the coating unit 124 requires information fi a coating is desired and the type of coating.

The control of the units may depend on the required marking. For example, if a given image is to be marked on a metal surface, the image is to be analysed so that the beam generator and marking unit may be controlled. In addition, the properties of the object, such as the quality of the metal surface may be taken into account.

In an embodiment, the apparatus comprises automatic or semi-automatic mechanics (not shown in the schematic FIG. 1) to switch or change objects to be marked on the bed 108. The mechanics may be under the control of the controller unit or control circuitry 100. In an embodiment, the objects are changed manually.

The operation of the apparatus of FIG. 1 will be explained in detail below.

In an embodiment, the above analysis and control may be performed by the controlling unit 100. In another embodiment, a separate controlling device may be utilised. The separate controlling device may determine suitable control parameters and send the control information to the apparatus utilising the interface 104.

Figure 2:
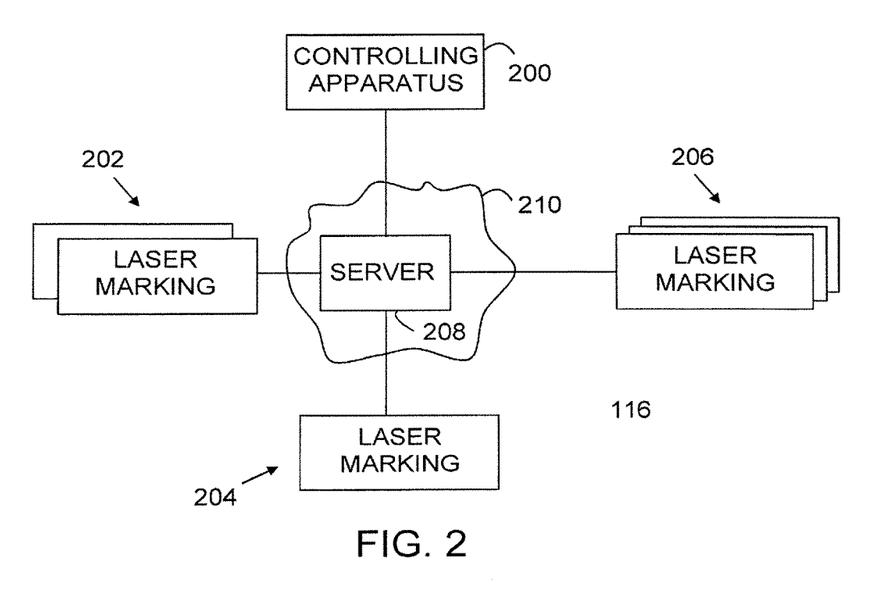
FIG. 2 illustrates an example a laser marking system.

FIG. 2 illustrates an example a laser marking system comprising a separate controlling apparatus and one or more apparatuses for marking a metal surface as illustrated in FIG. 1, the apparatuses being operatively connected with each other via a server in the Internet.

The system comprises a controlling unit or apparatus 200, and one or more installations of laser marking apparatuses 202, 204, 206, each installation comprising one or more laser marking apparatuses. In the example of FIG. 2, installation 202 comprises two laser marking apparatuses, installation 204 one laser marking apparatus and installation 206 three laser marking apparatuses.

In an embodiment, the controlling unit or apparatus 200 is connected to a server 208 in the Internet. The installations and laser marking apparatuses of the installations are likewise connected to the server 208. The controlling apparatus may control the operation of the laser marking apparatuses via the server 208.

In an embodiment, the server 208 may be replaced with a cloud service 210, i.e. a server service offered by an external operator, for example.

A separate controlling unit 200 simplifies the use of the laser marking devices. Determining the control information required by the laser marking apparatuses may be a task demanding special knowledge some small manufacturers are not ready to acquire. In the example of FIG. 2, the three installations 202, 204, 206 may be at different locations and owned by different manufacturers. They may utilise the laser marking apparatuses in the manufacture of their own products. The products may be marked, decorated or coloured by the laser marking apparatuses. However, the control information required by the apparatuses may be supplied by the controlling unit 200 of a fourth vendor, for example the manufacturer of the laser marking apparatuses. The three manufacturers may send information on the desired marking (for example an image) to the controlling unit 200 via the server 208 or cloud service 210. The required control data is determined by the controlling unit 200 and sent back to the installations 202, 204, 206.

Figure 3:
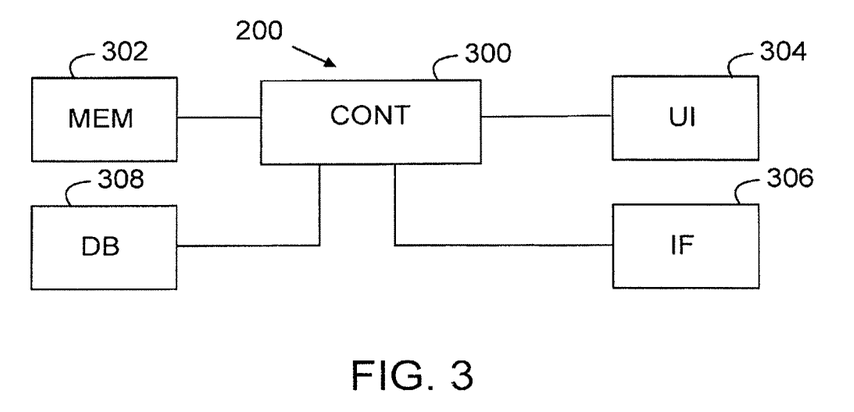
FIG. 3 illustrates an example a controlling apparatus.

FIG. 3 illustrates an example a controlling unit or apparatus 200. The controlling apparatus comprises a controller or control circuitry 300 typically but not necessarily realized with at least one processor. The apparatus further comprises at least one memory 302 including computer program code.

The apparatus further comprises user interface 304 typically including a display, a keyboard or respective input device, a mouse or other device known in the art.

The apparatus further comprises an interface 306 configured to connect the apparatus to other devices and networks such as Internet. The apparatus may be connected to a scanner, for example. The interface may realize wired or wireless connections or both.

The apparatus may further comprise a connection to a database 308 where some data useful for determining control information may be stored.

Figure 4:
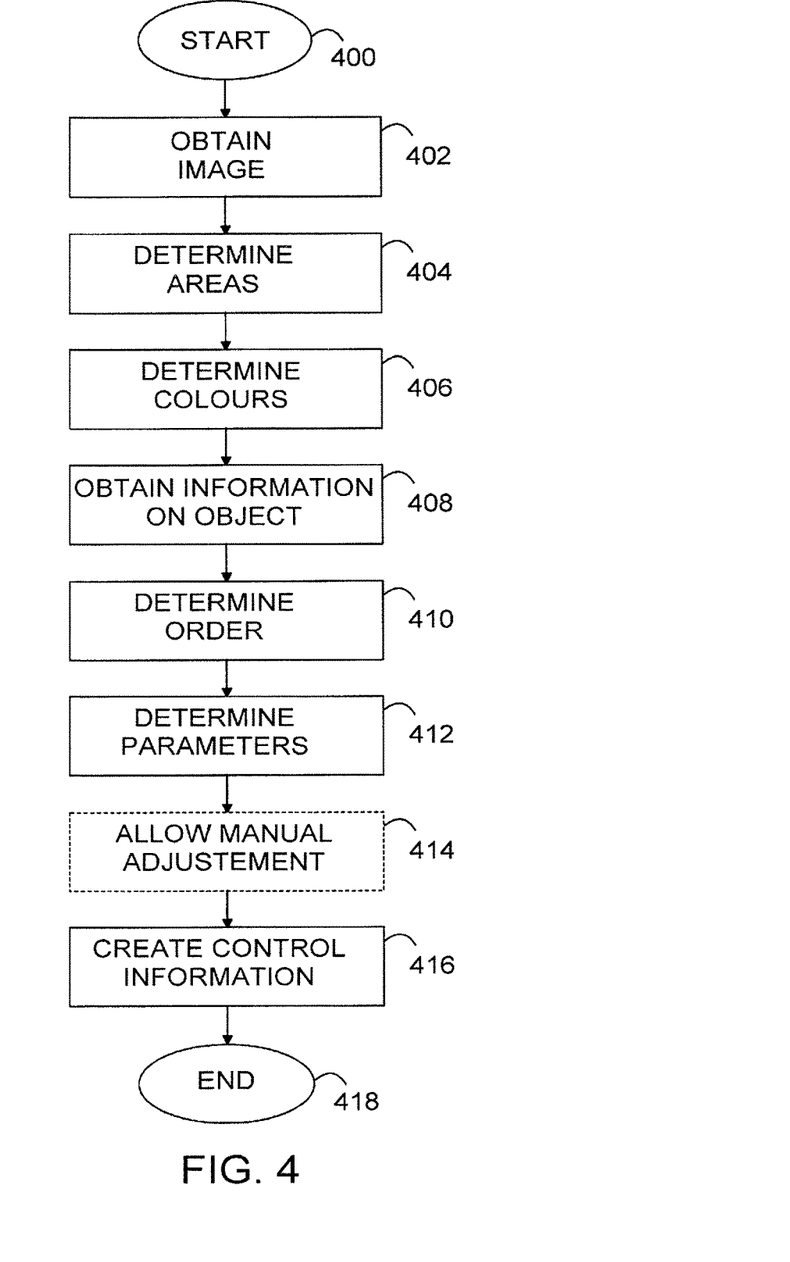
FIG. 4 is a flowchart illustrating an example of the determination of control information.

FIG. 4 is a flowchart illustrating an embodiment of the invention. This example illustrates the determination of the control information required in the laser marking process performed by the laser marking apparatus of FIG. 1. The steps of this example may be performed by the controlling apparatus 200 of FIG. 3 or by the controller of the apparatus of FIG. 1. In an embodiment, suitable software may be run in an apparatus to perform the steps.

The embodiment starts at step 400.

In step 402, the apparatus is configured to obtain a file comprising an image. The image is to be marked on the metal surface of an object. In an embodiment, the image may be obtained through the user interface 304, or interface 306 from an outside network (email, for example). The image file may in any electrical format such as jpg (Joint Photographic experts Group), tiff (Tagged Image File Format), eps (Encapsulated PostScript), doc (Microsoft Word document, for example.

In an embodiment, the image may be obtained through the interface 306 as a scanned image.

In step 404, the apparatus is configured to determine differently coloured areas of the image. The apparatus may be configured to analyse the image file and determine one or more continuous area having the same fill colour.

In step 406, the apparatus is configured to determine the colours of the image. The steps 404 and 406 may be performed simultaneously. In determining the areas and colours some threshold values may be used when separating colours from each other.

In step 408, the apparatus is configured to obtain information on the object or objects to be marked using the laser marking process. The material, quality of the surface and thickness of the surface may have an effect on the parameters. For example, a steel surface may have numerous different properties depending on the manufacturer of the steel and the purpose the steel was manufactured for. In addition, some steel surfaces have been standardized. Thus, a given steel type denoted with a given identification is known to have given predetermined properties. For example, the following table illustrates the number and name of some steel types which have been standardized in the standard SFS-EN 10088-2:N.

TABLE 1

| Standard No | Standard Name |
|---|---|
| 1.4016 | X6Cr17 |
| 1.4512 | X6CrTi12 |
| 1.4372 | X5CrNiMn17-5-6.5 |
| 1.4310 | X10CrNi18-8 |
| 1.4318 | X2CrNiN18-7 |
| 1.4307 | X2CrNi18-9 |
| 1.4306 | X2CrNi19-11 |
| 1.4311 | X2CrNiN18-10 |
| 1.4301 | X5CrNi18-10 |
| 1.4948 | X6CrNi18-11 |
| 1.4303 | X5CrNi18 12 |
| 1.4541 | X6CrNiTi18-10 |
| 1.4878 | X12CrNiTi18-9 |
| 1.4404 | X2CrNiMo17-12-2 |
| 1.4401 | X5CrNiMo17-12-2 |
| 1.4406 | X2CrNiMoN17-12-2 |
| 1.4432 | X2CrNiMo17-12-3 |

TABLE 1-continued

| Standard No | Standard Name |
|---|---|
| 1.4435 | X2CrNiMo18-14-3 |
| 1.4436 | X3CrNiMo17-13-3 |
| 1.4571 | X6CrNiMoTi17-12-2 |
| 1.4429 | X2CrNiMoN17-13-3 |
| 1.4438 | X2CrNiMo18-15-4 |
| 1.4539 | X1NiCrMoCu25-20-5 |

The following table illustrates examples of some standardized steel surfaces according to the standard SFS-EN 10088-2:N. Each surface type has been given a name or abbreviation which is illustrated in the table.

TABLE 2

| Abbreviation |
|---|
| 1E |
| 1D |
| 2H |
| 2C |
| 2E |
| 2D |
| 2B |
| 2R |
| 2Q |
| 1G or 2G |
| 1J or 2J |
| 1K or 2K |
| 1P or 2P |
| 2F |

The tables above are merely illustrative examples. Embodiments of the invention are not limited to above mentioned steel types. Also other types of steel and metal in general may be marked.

For example, electrolytically polished or coloured steel surfaces are suitable for laser marking. These surfaced may be decorated with markings and colours. In addition, laser marking may be utilised on electrolytically polished or coloured steel surfaces to obtain more colours and colour layers. In addition, titanium or alloys of titanium and aluminium may be marked.

In an embodiment, the apparatus may query the information from a user using the user interface 304. In an embodiment, the information may be obtained from the same source as the image file.

In step 410, the apparatus is configured to determine the order the differently coloured areas of the image will be processed.

In step 412, the apparatus is configured to determine parameters for the marking process. The parameters may comprise control information for the laser beam forming, the temperature, the atmosphere and the coating of the object after the laser marking.

In an embodiment, the apparatus may be configured to select preinstalled parameter values from a data base 308 connected to the apparatus. For example, the data base may comprise predetermined parameter values for a given material and given surface type.

In an embodiment, the parameters for the laser marking device are determined separately for each differently coloured area of the image.

In an embodiment, factors having an effect on the parameters of a given area may comprise the colour of the area, the size of the area, the colour of adjacent areas and the order in which the areas are marked, the material, quality and thickness of the surface.

Each area or each colour may require different temperature. Thus, the temperature values may be required to change over the marking process.

The atmosphere has an effect on the marking process. The parameters may comprise information on required gas content.

In an embodiment, the parameters stored in the data base are selected based on empirical studies.

In an embodiment, in step 414, the apparatus is configured to allow a manual adjustment of the determined parameter values. For example, the apparatus may display the selected values on a display.

In step 416, the apparatus is configured to create the control information comprising the determined parameters. The control information may be stored in a data file.

In an embodiment, the laser beam control parameters, the atmosphere parameters, the temperature parameters and coating parameters may be initially stored in separate files and combined to a single file.

The process ends in step 418.

Figure 5:
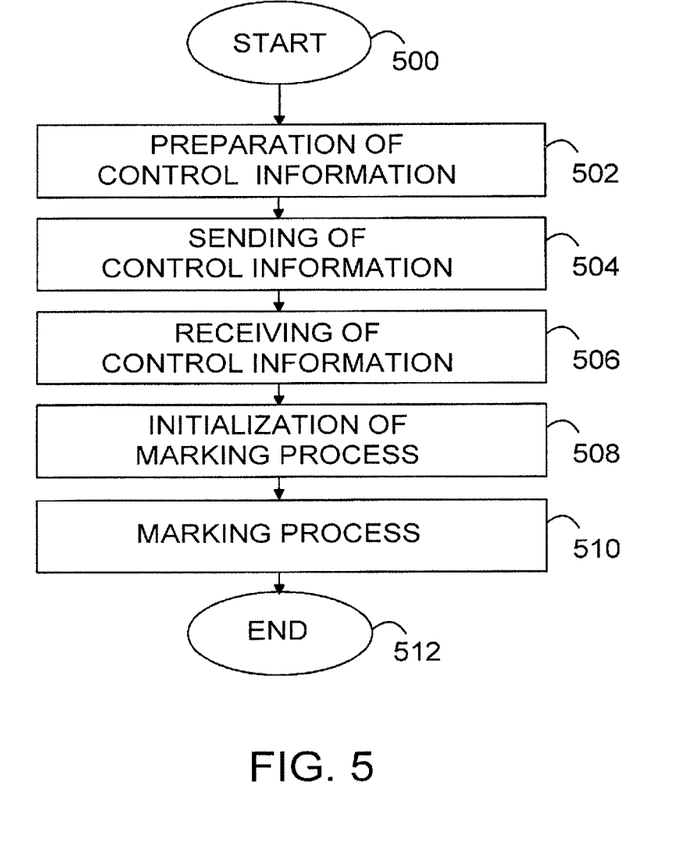
FIGS. 5 and 6 are flowcharts illustrating embodiments of the invention.

FIG. 5 is a flowchart illustrating an embodiment of the invention. This example illustrates the operation of system of FIG. 2.

The embodiment starts at step 500.

In step 502, the controlling apparatus 200 is configured to prepare the control information as described in FIG. 4, for example.

In step 504, the controlling apparatus 200 is configured to send the control information to the server 208 or to a cloud service 210.

In step 506, a laser marking apparatus of an installation, say installation 206, is configured to retrieve control information from the server 208 or the cloud service 210.

In an embodiment, the server 208 or cloud service 210 is configured to store the control information or several sets of control information for different marking processes for future use. A laser marking apparatus may be configured to retrieve currently required control information which has been prepared beforehand and stored in the server 208 or cloud service 210.

In step 508, the laser marking apparatus is configured to initialize a marking process. The initialization may comprise prompting a user to prepare suitable gases in the gas unit and setting units to be marked ready for marking, for example.

In step 510, the laser marking apparatus is configured to perform the marking process according to the control information. The marking process may comprise the marking of several objects. The switching of the objects may be automatic or semi-automatic or manual depending on the realization of the laser marking apparatus.

The process ends in step 512.

Figure 6:
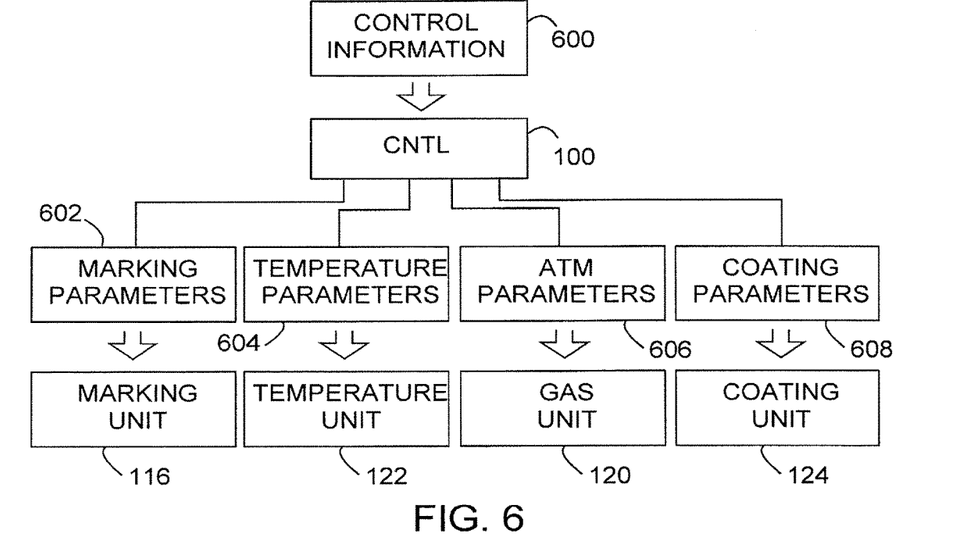

FIG. 6 is another chart illustrating an example embodiment of the invention. The operation of the laser marking apparatus of FIG. 1 is illustrated.

The controller unit or control circuitry 100 of a laser marking apparatus has as an input the control information 600 which is either generated by a controller and received from a network server or cloud service or generated at the marking apparatus. In addition, the control information may be received in part from the network and generated in part at the apparatus.

The controller unit or control circuitry is configured to send parameters 602 related to the laser beam generation and control to the marking unit 116. The parameters comprise the wavelength, and power of a laser beam, the beam diameter of a laser beam, driving angle and beam density of the laser beam and the number of laser scans to be performed, for example. Some non-limiting examples of possible values are illustrated in Table 3.

TABLE 3

| Parameter | Example values |
|---|---|
| Beam diameter | 0.01 mm-10 mm |
| Fill density | 0.01 mm-10 mm |
| Number of laser scans | 1-20 |
| Power | 5-900 W |
| Wavelength | 193-10600 nm |
| Focus from 0-point | −200-200 mm |
| Driving angle | −180-180 deg |
| Pulse frequency | 1-400 kHz |
| Pulse duration | 1 ns-12 s |

In some situations, it may be advantageous to utilise laser in such a manner that the laser hits the steel surface a given distance from 0-point, i.e. the point of largest energy density. The parameter Focus from 0-point illustrates this parameter.

Pulsating lasers may also be utilised. With a pulsating laser it is possible to obtain greater maximum powers than with a continuous laser.

The controller unit or control circuitry is configured to send parameters 604 related to the temperature control to the temperature unit 122. The parameters comprise one or more required temperature values of atmosphere surrounding the laser marking device and the object to be marked during a marking process, and one or more time intervals, the temperature being independently controlled during each interval. Some non-limiting examples of possible values are illustrated in Table 4.

TABLE 4

| Parameter | Example values |
|---|---|
| Preheating | 4-190 C. |
| Constant heat | 4-330 C. |
| Afterheat | 4-190 C. |

In Table 4, preheating denotes the temperature before the actual marking process, Constant heat the temperature during the actual marking process and Afterheat the temperature after actual marking process. The given values are examples only. There may be more intervals during the process.

The controller unit or control circuitry is configured to send parameters 606 related to the atmosphere control to the gas unit 120. The parameter indicates the desired gas content of the space surrounding the object to be marked. The gas content may comprise one or more gases. Examples of possible gases comprise argon, helium, oxygen, carbon dioxide, air and mixtures of these.

The controller unit or control circuitry is further configured to send parameters 608 related to the coating control to the coating unit 124. Typically, the coating is a nano coating or epoxy coating having a thickness of 0.01 to 0.5 mm.

The parameters for the laser marking device may be determined and applied separately for each area of the image with different colours.

In general, markings created using a laser beam are based on the oxidation effect created by the laser beam. Applying several laser sweeps over a surface several oxidized layers may be created on the surface of an object. When viewed from a distance the oxidized layers have an effect on how light reflects from the surface. Differently oxidized layers produce different reflections and are seen as different colours. However, the strength and structure of the surface remains the same. Thus, the strength of a steel surface remains resistant to wear, for example.

By determining the laser beam properties carefully and applying beam control multi-coloured markings may be created.

Applying different gases and temperatures during the beam sweeps the result may be further adjusted as desired.

In an embodiment, the marking unit transmitting the laser beam or beams comprise a sensing unit configured to determine the outline of the object to be marked. In an embodiment, the sensing unit may be based on optical sensors and it can thus control the marking unit to follow the outlines of a three-dimensional object. This way the object to be marked need not be flat but it may have any physical shape.

In an embodiment, the bed 108 may comprise a rotational unit which may rotate the object to be marked. This applies especially to cylinder-shaped objects. In an embodiment, the marking unit is movable. In an embodiment, the lens system of the marking unit is configured to direct the beam to the object according to the optical sensors.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented at least in part as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claim.

The invention claimed is:

1. A controlling apparatus, comprising:
at least one processor; and
at least one memory including computer program code,
wherein the at least one memory and the computer program code are configured to, with the at least one processor, cause the controlling apparatus at least to:
obtain with one or more interface a file comprising an image to be marked on a metal surface placed in a covered space;
analyze the image to be marked on the metal surface and determine colors present in the image and one or more continuous areas of the image having the same fill color;
obtain with the one or more interface information on the quality and thickness of the metal surface of an object to be marked;
determine order in which the areas of the image with different colors are to be marked;
determine temperature parameters for a temperature control unit of a laser marking apparatus controlling temperature of atmosphere surrounding the laser marking apparatus;
determine atmosphere parameters for a gas unit of the laser marking apparatus;
determine laser beam forming parameters for a laser marking unit of the laser marking apparatus separately for each area of the image with different colors;
determine coating parameters for a coating unit of the laser marking apparatus;
enable a manual adjustment of the determined temperature parameters, atmosphere parameters, laser beam forming parameters and coating parameters for the user through the one or more interface;

generate control information including final temperature parameters for use in the temperature control unit to control a temperature within the covered space, final atmosphere parameters for use in the gas unit to control an atmosphere of the covered space, final laser beam forming parameters for use in controlling focus and bandwidth of the laser marking unit and producing a pattern on the metal surface, and final coating parameters for use in the coating unit to produce a coating on the metal surface; and create a marking file containing the control information for controlling the laser marking apparatus.

2. The apparatus of claim 1, wherein the parameters for the laser marking apparatus comprise the wavelength and power of a laser beam.

3. The apparatus of claim 2, wherein the parameters for the laser marking apparatus comprise the beam diameter of a laser beam, driving angle and beam density of the laser beam and the number of laser scans to be performed.

4. The apparatus of claim 3, wherein the apparatus is configured to determine one or more values for the parameters for the laser marking apparatus, and time instant when one or more values are changed during marking process and store information in the marking file.

5. The apparatus of claim 1, wherein the information on the object to be marked further comprises the material of the object.

6. The apparatus of claim 1, wherein the apparatus is configured to:
determine the size of each differently colored area of the image; and
take the determined sizes and the order in which the areas of the images are to be marked into account when determining parameters for the laser marking apparatus.

7. The apparatus of claim 1, further configured to:
receive information on the one or more required temperature values of atmosphere surrounding the laser marking apparatus and the object to be marked during a marking process, and corresponding number of time intervals, the temperature being independently controlled during each interval; and
store the information to a temperature control file.

8. The apparatus of claim 1, further configured to:
receive information on a gas required to surround the laser marking apparatus and the object to be marked during a marking process; and
store the information to a gas control file.

9. The apparatus of claim 1, further configured to:
receive information on a coating required to be sprayed on the object to be marked after the marking process; and
store the information to a coating control file.

10. The apparatus of claim 1, the apparatus comprising a communication interface configured to transmit one or more control files to an apparatus for marking a metal surface.

11. The apparatus of claim 1 the apparatus comprising a communication interface configured to transmit one or more control files to a server connected to the Internet.

12. The apparatus of claim 1, wherein the parameters for the laser marking apparatus determine the color to be produced on the surface.

13. A non-transitory computer readable medium having a computer program product comprising program instructions which, when loaded into an apparatus and executed by the apparatus, instruct at least one processor and at least one memory of the apparatus to perform the steps comprising:

obtain a file comprising an image to be marked on a metal surface placed in a covered space;
analyze the image to be marked on the metal surface and determine colors present in the image and one or more continuous areas of the image having the same fill color;
obtain information on the quality and thickness of the surface of an object to be marked;
determine information on order in which the areas of the image with different colors are to be marked;
determine laser beam forming parameters for a laser marking unit of a laser marking apparatus separately for each area of the image with different colors;
enable a manual adjustment of the determined laser beam forming parameters for the user through one or more interface;
generate control information including final temperature parameters for use in a temperature control unit of the laser marking apparatus to control a temperature within the covered space, final atmosphere parameters for use in a gas unit of the laser marking apparatus to control an atmosphere of the covered space, final laser beam forming parameters for use in controlling focus and bandwidth of the laser marking unit and producing a pattern on the metal surface, and final coating parameters for use in a coating unit of the laser marking apparatus to produce a coating on the metal surface; and
create a marking file containing the control information for controlling the laser marking apparatus.

14. A controlling apparatus, comprising:
at least one processor; and
at least one memory including computer program code,
wherein the at least one memory and the computer program code are configured to, with the at least one processor, cause the controlling apparatus at least to:
obtain with one or more interface a file comprising an image to be marked on a metal surface placed in a covered space;
analyze the image to be marked on the metal surface and determine colors present in the image and one or more continuous areas of the image having the same fill color;
obtain with the one or more interface information on the quality and thickness of the metal surface of an object to be marked;
determine order in which the areas of the image with different colors are to be marked;
determine atmosphere parameters for a gas unit of a laser marking apparatus;
determine laser beam forming parameters for a laser marking unit of the laser marking apparatus separately for each area of the image with different colors;
enable a manual adjustment of the determined atmosphere parameters and laser beam forming parameters for the user through one or more interface;
generate control information including final temperature parameters for use in a temperature control unit of the laser marking apparatus to control a temperature within the covered space, final atmosphere parameters for use in the gas unit to control an atmosphere of the covered space, final laser beam forming parameters for use in controlling focus and bandwidth of the laser marking unit and producing a pattern on the metal surface, and final coating parameters for use in a coating unit of the laser marking apparatus to produce a coating on the metal surface; and create a marking file containing the control information for controlling the laser marking apparatus.

15. A controlling apparatus, comprising:

at least one processor; and at least one memory including computer program code, wherein the at least one memory and the computer program code are configured to, with the at least one processor, cause the controlling apparatus at least to:

obtain with one or more interface a file comprising an image to be marked on a metal surface placed in a covered space;

analyze the image to be marked on the metal surface and determine colors present in the image and one or more continuous areas of the image having the same fill color;

obtain with the one or more interface information on the quality and thickness of the metal surface of an object to be marked;

determine order in which the areas of the image with different colors are to be marked;

determine laser beam forming parameters for a laser marking unit of a laser marking apparatus separately for each area of the image with different colors; and enable a manual adjustment of the determined laser beam forming parameters for the user through one or more interface;

generate control information including final temperature parameters for use in a temperature control unit of the laser marking apparatus to control a temperature within the covered space, final atmosphere parameters for use in a gas unit of the laser marking apparatus to control an atmosphere of the covered space, final laser beam forming parameters for use in controlling focus and bandwidth of the laser marking unit and producing a pattern on the metal surface, and final coating parameters for use in a coating unit of the laser marking apparatus to produce a coating on the metal surface; and create a marking file containing the control information for controlling the laser marking apparatus.

* * * * *